(12) United States Patent
Taxier et al.

(10) Patent No.: US 10,180,621 B2
(45) Date of Patent: Jan. 15, 2019

(54) SYSTEMS, METHODS, AND DEVICES FOR USABILITY TESTING

(71) Applicant: DISH Technologies L.L.C., Englewood, CO (US)

(72) Inventors: Karen Taxier, Englewood, CO (US); Luke VanDuyn, Conifer, CO (US); Matthew Bailey, Centennial, CO (US)

(73) Assignee: DISH Technologies L.L.C., Englewood, CO (US)

( * ) Notice: Subject to any disclaimer, the term of this patent is extended or adjusted under 35 U.S.C. 154(b) by 0 days.

(21) Appl. No.: 14/829,147

(22) Filed: Aug. 18, 2015

(65) Prior Publication Data

US 2017/0052432 A1     Feb. 23, 2017

(51) Int. Cl.
| | | |
|---|---|---|
| G03B 17/56 | (2006.01) | |
| H04N 5/232 | (2006.01) | |
| H04N 5/225 | (2006.01) | |

(52) U.S. Cl.
CPC ......... G03B 17/561 (2013.01); G03B 17/566 (2013.01); H04N 5/2251 (2013.01); H04N 5/2253 (2013.01); H04N 5/23203 (2013.01)

(58) Field of Classification Search
CPC ................................ G03B 17/00; G03B 17/56
USPC ................................................. 396/419, 422
See application file for complete search history.

(56) References Cited

U.S. PATENT DOCUMENTS

| | | | | |
|---|---|---|---|---|
| 4,091,402 A | * | 5/1978 | Siegel | G03B 15/041 |
| | | | | 362/3 |
| D591,324 S | * | 4/2009 | Sukhov | D16/242 |
| 2009/0003822 A1 | * | 1/2009 | Tyner | F16M 11/32 |
| | | | | 396/428 |
| 2012/0167441 A1 | * | 7/2012 | Holmberg | F41G 11/004 |
| | | | | 42/119 |
| 2016/0028874 A1 | * | 1/2016 | Mankopf | G06F 19/3406 |
| | | | | 455/420 |

FOREIGN PATENT DOCUMENTS

WO    WO 2014111468 A1 *  7/2014   ......... G06F 19/3406

OTHER PUBLICATIONS

"Mr Tappy—Filming Mobile Device Usability Testing is Easy—Photos", 4 pages, Mar. 2, 2012, retrieved from Internet Archive Wayback Machine <https://web.archive.org/web/20120302192932/http://www.mrtappy.com/photos.htm> on Mar. 24, 2017.*

(Continued)

*Primary Examiner* — Clayton E LaBalle
*Assistant Examiner* — Fang-Chi Chang
(74) *Attorney, Agent, or Firm* — Seed IP Law Group LLP

(57) ABSTRACT

According to principles of the embodiments as disclosed herein, a device for monitoring the use of a handheld device is provided which allows for increased accuracy and ease of monitoring the use of handheld devices during usability testing. The device includes a handheld device mount configured to be releasably coupleable to a handheld device. The handheld device mount includes a cavity and a base and opposing first and second sides and first and second sidewalls extending from the base at the sides of the base. The mast has a first and second end. The first end of the mast is coupled to and extends from a third side of the cavity. A camera mount is located at the second end of the mast and configured to receive a camera.

6 Claims, 4 Drawing Sheets

(56) References Cited

OTHER PUBLICATIONS

"Mr Tappy—Filming Mobile Device Usability Testing is Easy—Q &A", 7 pages, Mar. 2, 2012, retrieved from Internet Archive Wayback Machine <https://web.archive.org/web/20120302192928/http://www.mrtappy.com/everythingelse. htm> on Mar. 24, 2017.*
"Mr Tappy—Filming Mobile Device Usability Testing is Easy—Home Page", 2 pages, Mar. 1, 2012, retrieved from Internet Archive Wayback Machine <https://web.archive.org/web/20120301222122/http://www.mrtappy.com/index.html> on Mar. 24, 2017.*
"Mr Tappy—Filming Mobile Device Usability Testing is Easy—Vimeo", 2 pages, 2012 <https://vimeo.com/37421265> retrieved on Mar. 24, 2017.*
Melbourne, "Recording Mobile Device Usability Testing Sessions—Guerrilla Style," *ThoughtWorks,* Mar. 14, 2014, retrieved from https://www.thoughtworks.com/insights/blog/recording-mobile-device-usability-testing-sessions-%E2%80%93-guerrilla-style on Nov. 21, 2016, 16 pages.
Mr. Tappy "Mobile Device Usability Testing Made Easy," retrieved Nov. 21, 2016 from https://www.mrtappy.com/ 4 pages.

\* cited by examiner

SYSTEMS, METHODS, AND DEVICES FOR USABILITY TESTING

BACKGROUND

Technical Field

The present disclosure generally relates to systems, methods, and devices for use in usability testing and more particularly to a device for monitoring the use of a handheld device.

Description of the Related Art

Usability testing includes the evaluation of a product by testing the product on users and observing the way users interact with and use the product. The evaluation of the product's use and observation sometimes occurs in person and in real time. Many usability tests include provisions for an auditor to observe the users in an unobtrusive way; for example, a one-way mirror may be installed between two rooms, the reflective side facing the testing room, wherein a user interacts with the product, and a transparent side facing an observing room wherein an auditor observes the use of the product. In this way, an auditor may monitor the activities of the user without the user observing the auditor's movements, note taking, or other actions. This testing setup limits the ability of the auditor to closely monitor some aspects of the user's interaction with the product. For example, observing small movements and interactions with the product may be difficult when the auditor is in another room and separated from the user by a wall or one-way mirror.

Usability testing may also include video and audio recording of the user interacting with the product. The video and recording equipment is fixed in positions around the room. Because the video and recording equipment is in a fixed location, the user may be instructed to limit their use to a confined area within the room. For example, in usability testing of handheld devices, the user may be asked to only use the product within a confined space and in a certain orientation within the room so that the video and recording equipment can monitor the user's interaction with and use of the product.

BRIEF SUMMARY

According to principles of the embodiments as disclosed herein, a device for monitoring the use of a handheld device is provided. The device allows for increased accuracy and ease of monitoring the use of handheld devices during usability testing. The device includes a handheld device mount configured to releasably couple to a handheld device. The handheld device mount includes a cavity and has a base and opposing first and second sides, and first and second sidewalls extending from the base at the sides of the base. The mast has a first and second end. The first end of the mast is coupled to and extends from a third side of the cavity. A camera mount is located at the second end of the mast and is configured to receive a camera.

By including a handheld device mount and camera mount at opposite ends of a mast, a handheld device, such as a remote control, and a camera are easily connected to each other and oriented such that the camera has a clear view of a person's use of a remote control.

Another embodiment of a device for monitoring the use of the handheld device includes a body that extends longitudinally between a first end configured for gripping by a user and a second end. The device also includes a mast having a first and second end. The first end of the mast is coupled to and extends from the second end of the body. The device may also include a camera mount at the second end of the mast. The camera mount is configured to receive a camera. The device also includes a wireless communication transmitter and a plurality of buttons configured to receive input from a user.

One method of easily recording usability information includes coupling a handheld device to a cavity. The cavity is defined by a base and opposing first and second sides and first and second sidewalls extending from the base at respective ones of the first and second sides. The method also includes coupling a camera to a camera mount, the camera mount located at a distal end of a mast, the mast extending from a third side of the cavity. The method also includes imaging the handheld device while a user uses the handheld device.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. Some of these elements might be enlarged and positioned to improve drawing legibility and understanding of the features.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with usability testing, usability testing systems, and methods of using usability testing systems and devices have not been shown or described in detail to avoid unnecessarily obscuring descriptions of the embodiments.

Unless the context requires otherwise, throughout the specification and claims that follow, the word "comprise" and variations thereof, such as "comprises" and "comprising," are to be construed in an open, inclusive sense, that is, as "including, but not limited to."

References throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment.

The use of ordinals such as first, second and third does not necessarily imply a ranked sense of order, but rather may only distinguish between multiple instances of an act or structure.

The headings and Abstract of the Disclosure provided herein are for convenience only and do not limit the scope or meaning of the embodiments.

Figure 1:
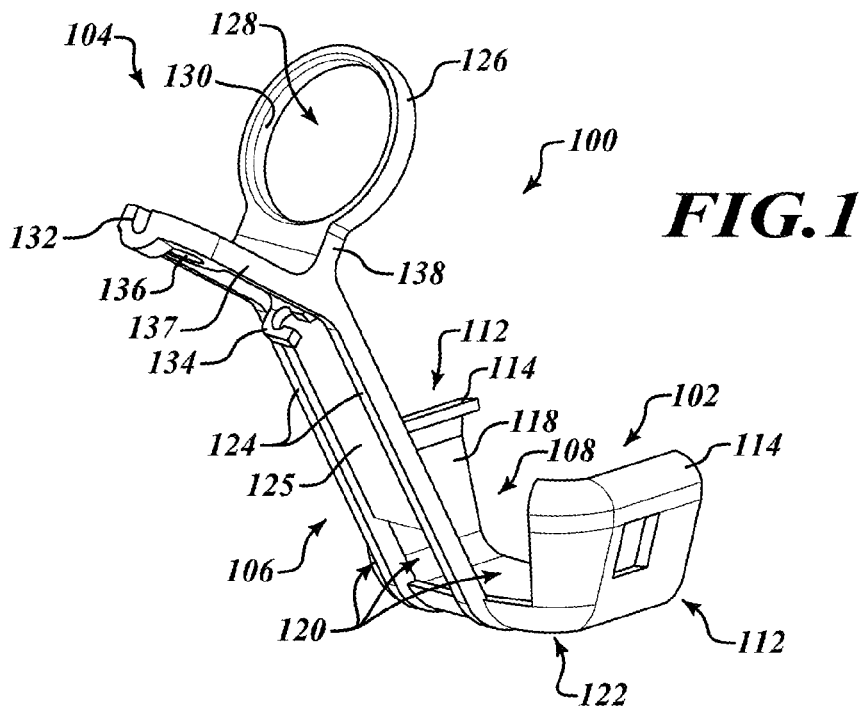
FIG. 1 is an isometric view of a camera and handheld device coupler according to one embodiment of the present disclosure.
Figure 2:
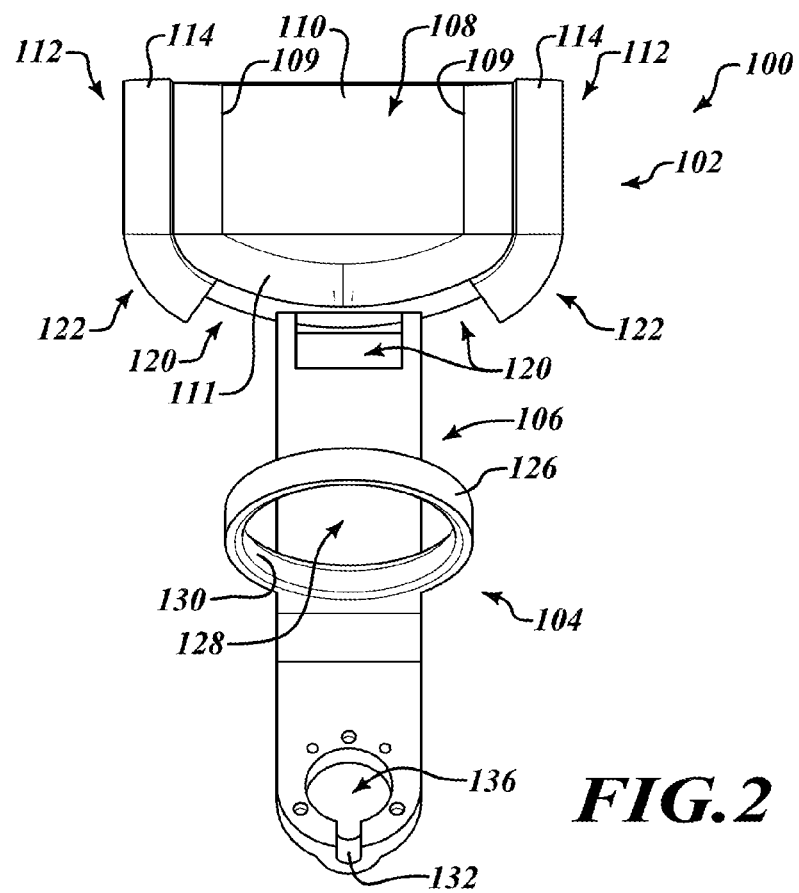
FIG. 2 is a top view of the camera and handheld device coupler of FIG. 1.

FIGS. 1 and 2 show an isometric and top view, respectively, of a handheld device and camera coupler 100. The handheld device and camera coupler 100 includes a handheld device mount 102 and a camera mount 104 on opposite ends of a mast 106. The handheld device mount 102 includes a cavity 108 that is configured to receive a handheld device. A base 110 and one or more sidewalls 112 for the cavity 108. As shown in FIG. 2, the base 110 may include one or more sides. The base 110 in FIG. 2 includes a front side 111 and a back side that extends between one or more lateral sides 109.

The sidewalls 112 extend up from a surface of the base 110. As explained in more detail below, the sidewalls may be sized and shaped to correspond with a size and shape of a handheld device such that the sidewalls 112 receive and engage with the body of the handheld device. For example, the inner surface 118 of the sidewalls 112 may have a size and shape that matches the size and shape of the sides of the body of the handheld device.

The sidewalls may also include one or more upper portions 114. The upper portions will overlay the top of the handheld device and may have a size and shape that conforms to a size and shape of an upper surface of the handheld device. The upper portions 114 will serve to grip the handheld device in cooperation with the base 110 and sidewalls 112.

The sidewalls 112 may also include one or more end portions 122. As shown in FIGS. 1 and 2, the end portions 122 may extend from the sidewalls towards the front of the cavity 108. The end portions 122 may have a size and shape that conforms to a size and shape of a surface of the end of the handheld device. In some embodiments, the end portions 122 may extend from a first sidewall 112 to a second sidewall 112, enclosing the front end of the cavity 108.

As shown in FIGS. 1 and 2, the front end of the handheld device mount 102 may include apertures 120. The apertures 120 allow wireless signals emitted from the handheld device, for example, infrared light signals, to pass through the apertures 120 and reach their intended receiver, for example a set-top box or television.

In some embodiments, the sidewalls 112 may also be flexible and/or somewhat elastic. For example, the sidewalls 112 may conform to a shape of a handheld device when the device is inserted within the cavity 108; but in a rest state, a distance between the sidewalls 112 may be less than the width of the handheld device. In such an embodiment, as the handheld device is inserted into the cavity 108, the sidewalls 112 are flexed and pushed apart. The sidewalls 112 have some elastic properties and act to return to their original shape. The flexing and deformation of the sidewalls 112 causes the sidewalls 112 to impart a lateral, clamping force onto the handheld device that is inserted within the cavity 108.

The upper portions 114 of the sidewalls 112 in cooperation with the base 110 may also impart a clamping force onto the handheld device. For example, a distance between the upper portions 114 and the base of the cavity 108 may be less than a height of the handheld device in a rest state. When the handheld device is inserted into the cavity 108, the upper portions 114 of the sidewalls 112 are flexed upward, yet they are resilient and impart a return force. The upward flexing of the upper portions 114 of the sidewalls 112 causes them to impart a clamping force onto the handheld device between the base and the upper portions 112 of the cavity 108.

The mast 106 extends from the front end of the handheld device mount 102. The mast 106 includes a material web 125 between two opposing flanges 124. The web 125 and flanges 124 support and stiffen the mast 106. For example, the web 125 resists bending forces imparted on the sides of the mast 106. In FIG. 2 these bending forces are in a direction left and right across the page. The flanges 124 also resist bending due to forces imparted on the front and back of the mast 106. In FIG. 2 these forces are generally into and out of the page.

The mast 106 may also include an aperture 120. The aperture 120 may allow wireless signals emitted from the handheld device, for example, infrared light signals, to pass through the apertures 120 and reach their intended receiver, for example, a set-top box or television. In some embodiments, the mast may be fabricated from material that is transparent to the wireless signals such that the wireless signals pass through the mast with little or no attenuation.

The lower end of the mast 106 is coupled to the handheld device mount 102. As shown in FIGS. 1 and 2, the lower end of the mast is integral with the handheld device mount 102. In some embodiments, the mast 106 may be releasably coupled to the handheld device mount 102.

The second or distal end of the mast 106 is at an end of the mast 106 opposite the first end of the mast 106 that is coupled to the handheld device mount 102. A camera mount 104 is located at the distal end of the mast 106. The length, position, and orientation of the mast facilitate placing the camera mount at a location from which a camera may have an unobstructed view of the handheld device mounted in the handheld device mount 102, when the camera is mounted to the camera mount 104.

The camera mount 104 may include a base 137. The base 137 may extend from the second or distal end of the mast 106. The base 137 provides a platform for the camera mounting structure. In the embodiment shown in FIGS. 1 and 2, the camera mounting structure includes him a hoop 126 mounted to the base 137 via an extension 138. The hoop 126 includes an inner surface 130 that defines an aperture 128. The inner surface 130 is sized and shaped to securely hold a camera within the aperture 128 of the hoop 126. In some embodiments, the camera and inner surface 130 are friction- or press-fit together such that the friction between the inner surface 130 of the hoop 126 and an outer surface of the camera holds the camera within the aperture 128.

Although the hoop 126 is shown as circular in the embodiment of FIGS. 1 and 2, the inner surface 130, the hoop 126, and the aperture 128 may have a noncircular shape. For example, the inner surface 130 and the hoop 126, may be square, rectangular, or other shape that conforms to the outer surface of a camera.

The camera mount 104, and in particular the base 137, may include cable management features. The cable management features may aid in reducing tangling and catching of the cables that extend from the camera mounted on the handheld device and camera coupler 100 during usability testing. For example, as shown in FIGS. 1 and 2, the base 137 includes a cable routing slot 132 connected to a cable routing aperture 136. As discussed in more detail below with reference to FIGS. 3 and 4, the cable routing slot 132 and aperture 136 aid in controlling the location of tables that may attach to a camera mounted on the camera mount 104.

The base 137 may also include additional cable management features, for example, the cable clip 134. The cable clip 134 extends from a bottom surface of the base 137 and includes an opening to receive and hold one or more cables.

Figure 3:
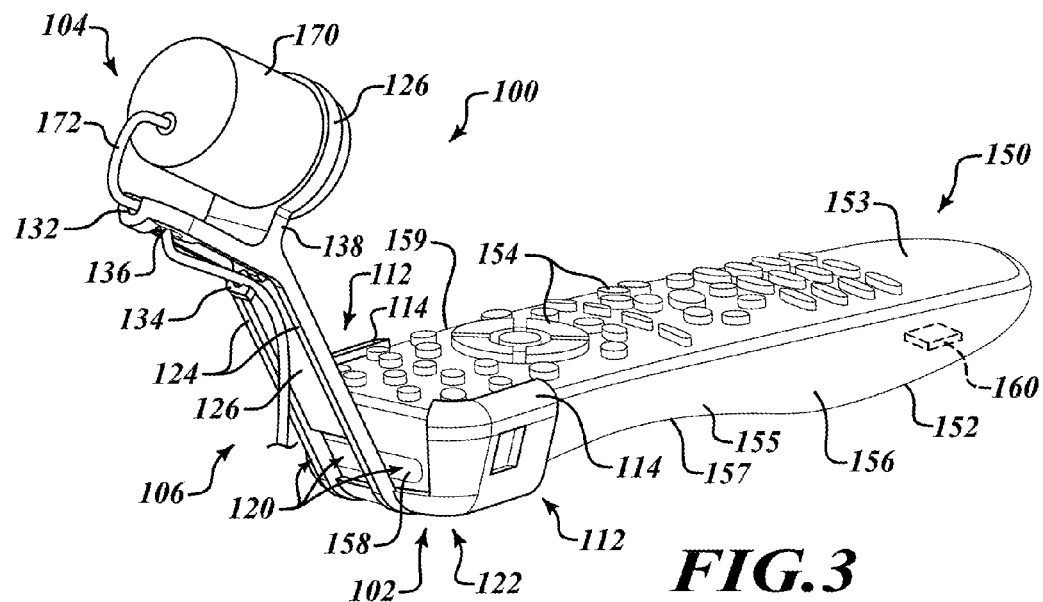
FIG. 3 is an isometric view of the camera and handheld device coupler while it is connecting a camera and handheld device to each other according to one embodiment of the present disclosure.
Figure 4:
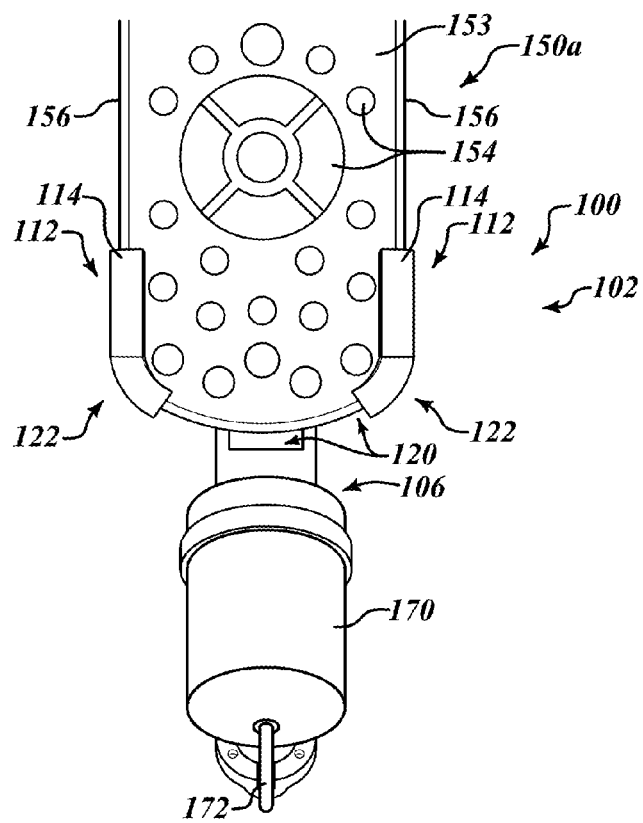
FIG. 4 is a top view of the camera and handheld device coupler including the camera and handheld device connected as shown in FIG. 3.

FIGS. 3 and 4 show an embodiment of a handheld device and camera coupler 100 with a handheld device 150 coupled to the handheld device mount 102 and a camera 170 coupled to the camera mount 104. The handheld device 150 shown in FIGS. 3 and 4 is a TV and set-top box remote control. In some embodiments, the handheld device 150 may be a tablet, smart phone, or other handheld device.

The handheld device 150 includes a body 155. The body 155 houses the internal components 160 of the handheld device 150. The components 160 of the handheld device 150 may include a processor, memory, input, output circuitry, communication components and other electrical components associated with a remote control or other handheld device. The internal components 160 are coupled to the inputs 154 located on an upper surface 153 of the handheld device 150. The internal components receive inputs from the input 154 or measure the state of the inputs 154 to determine the actions requested by a user. Based on a user's input, the internal components 160 of the remote control, for example, a processor, may issue commands that are transmitted via communication components within the handheld device 150. For example, the handheld device 150 may include an infrared transmitter as part of the internal components 160. The infrared light transmitted by the infrared transmitter may pass through a window 158 at the end of the handheld device 150. As shown in FIG. 3, the apertures 120 facilitate the transmission of infrared signals through the front of the handheld device 150 and the handheld device and camera coupler 100.

In some embodiments, internal components 160 may include other types of wired or wireless communication. For example, the remote control may transmit information and commands via Wi-Fi, Bluetooth, Z-wave, or other communication methods.

The body 155 of the handheld device 150 includes two sides 156, a bottom surface 157, and the upper surface 153. The handheld device 150 extends longitudinally between a first end 152, generally used as the gripping end or holding end of the handheld device 150, and a second end 159, also referred to as the a distal end or the coupling end of the handheld device 150.

As shown in FIG. 3, the handheld device 150 is coupled to the handheld device and camera coupler 100 via the handheld device mount 102. The handheld device 150 is inserted into the cavity 108 where the sidewalls 112 of the handheld device mount 102 hold onto the handheld device 150 via its the second end 159. The sidewalls 112 may exert a clamping force on the sides 156 of the body 155 of the handheld device 150 or may otherwise couple to the handheld device 150.

In FIGS. 3 and 4 the camera 170 is shown mounted to the handheld device and camera coupler 100. In the embodiment shown in FIGS. 3 and 4, the camera 170 has a cylindrical body with a circular cross section. The camera 170 is inserted into the aperture 128 of the hoop 126 where the inner surface 130 of the hoop 126 engages with the outer surface of the camera 170 to hold the camera in place. In some embodiments, an outer diameter of the body of the camera 170 may be larger than a diameter of the aperture 128 such that the camera 170 is press-fit into aperture 128 and a hoop or clamping force imparted by the hoop 126 holds the camera 170 in place.

The camera 170 may be adjusted with respect to the camera mount 104. For example, the camera may be adjusted further into or out of the hoop 126 such that it is closer to or further from the handheld device 150. The arrangement of the camera 170 within the camera mount 104 gives the camera a clear and unobstructed view of the upper surface 153 and the inputs 154 of the handheld device 150.

The camera 170 includes a power and communication cable 172 that provides power to the camera and facilitates between the camera 170 and, for example, a recording device or display, not shown.

In some embodiments, the camera may be wireless and include wireless communication capabilities, such as Wi-Fi, internal power storage, such as batteries, and internal storage, such as flash memory storage. In such embodiments, a power and communication cable 172 may not be used.

Figure 5:
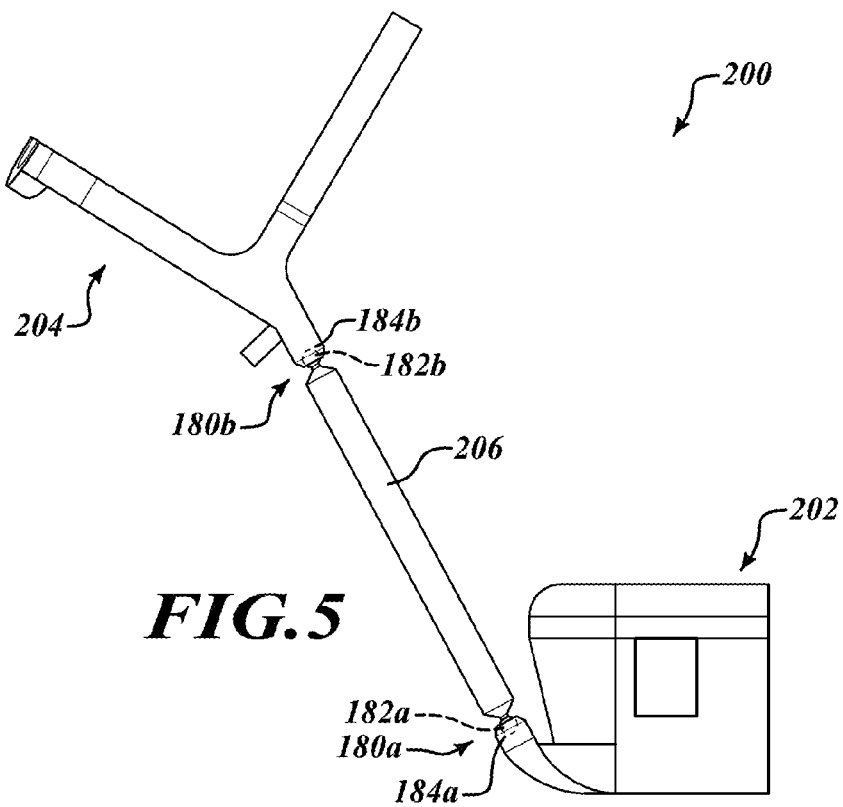
FIG. 5 is side view of a camera and handheld device coupler according to one embodiment of the present disclosure.

FIG. 5 shows an embodiment of a handheld device and camera coupler 200 that includes a hinged mast 106. The handheld device and camera coupler 200 includes a handheld device mount 202 and a camera mount 204 attached to opposite ends of a mast 206.

The mast 206 includes a lower hinge 180a and an upper hinge 180b. The hinges 180a, 180b allow the mast and, in particular, the camera mount 204 to be positioned and oriented relative to a handheld device coupled to the handheld device mount 202. The lower hinge 180a includes a pin 182a and a complementary socket 184a, which may be, for example, a knuckle. Friction between the pin 182a and the socket 184a holds the position and orientation of the mast 206 during use; but with appropriate force, the friction between the pin 182a and the socket 184a may be overcome to facilitate repositioning of the mast 206.

Similarly, the upper hinge 180b includes a pin 182b and a complementary socket 184b, which may be, for example, a knuckle. Friction between the pin 182b and the socket 184b holds the position and orientation of the camera mount 204 during use, but with appropriate force, the friction between the pin 182b and the socket 184b may be overcome to facilitate repositioning of the camera mount 204.

In some embodiments, the pins 182a, 182b of hinges 180a, 180b may be a ball. In such embodiments, the hinges 180a, 180b may be ball and socket hinges. In some embodiments, other hinge arrangements may be used, for example, a knuckle and pin arrangement may be used.

Figure 6:
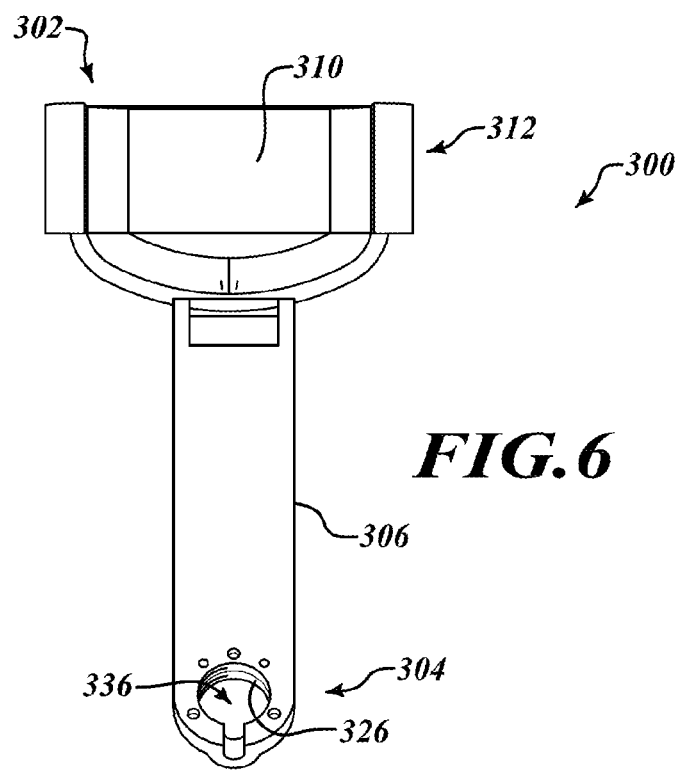
FIG. 6 is top view of a camera and handheld device coupler according to one embodiment of the present disclosure.

FIG. 6 shows an embodiment of a handheld device and camera coupler 300 with a threaded camera mount 304 and a simplified handheld device mount 302 at opposite ends of a mast 306. The camera mount 304 shown in FIG. 6 includes a camera mount aperture 336. The camera mount aperture 336 may be configured to facilitate coupling of a camera to the handheld device and camera coupler 300. In some embodiments, a fastener such as a bolt may pass through the aperture 336. The head of the fastener may engage with a bottom surface of the camera mount 304 while a threaded end of the fastener engages with a socket on a camera.

In some embodiments, for example as shown in FIG. 6, the aperture 336 of the camera mount 304 is threaded, and includes threads 326. The threads 326 of the aperture 336 may be of a ¼-20 type thread that is a common size in the photographic industry for tripod mounts. A ¼-20 type threaded socket is generally included in the body of most cameras. In some embodiments, the threads 326 of the aperture 336 may be of a ⅜-16 type thread that is also a common size in the photographic industry for tripod mounts.

As shown in FIG. 6, in some embodiments, a handheld device mount may be simplified. For example, the sidewalls 312 of the handheld device mount 302 extend up from a surface of the base 310, but do not include the one or more end portions 122 shown in FIGS. 1 and 2 that extend from the sidewalls 112 towards the front of the cavity 108. This simplified handheld device mount 302 provides a lighter-weight structure as compared to the handheld device mount 102 shown in FIGS. 1 and 2.

Figure 7:
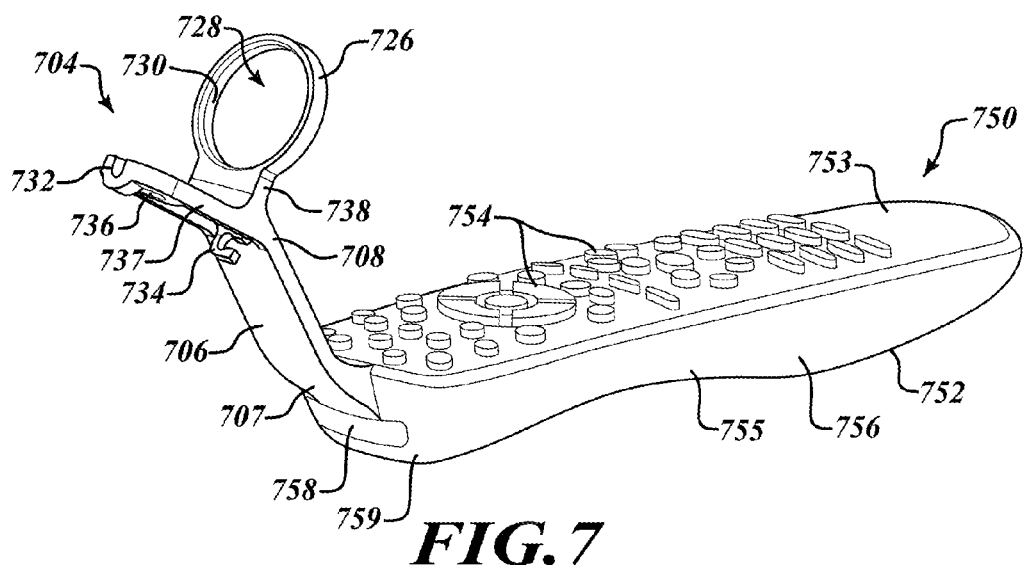
FIG. 7 is an isometric view of a handheld device according to one or more embodiments of the present disclosure.

FIG. 7 shows a handheld device 750 with a mast 706 and associated camera mount 704 that extends directly from the body of the handheld device 750.

The mast 706 extends from the front end of the handheld device 750. The mast 706 includes a first end 707 coupled directly to the handheld device 750 camera mount 704 at a second end 708.

The second or distal end 708 of the mast 706 is at an end of the mast 706 opposite the first end 707 of the mast 706 that is coupled to the handheld device. A camera mount 704 is located at the distal end of the mast 706. The length, position, and orientation of the mast facilitate placing the camera mount at a location from which a camera may have an unobstructed view of the handheld device 750, when the camera is mounted to the camera mount 704.

The camera mount 704 may include a base 737. The base 737 may extend from the second or distal end of the mast 706. The base 737 provides a platform for the camera mounting structure. In the embodiment shown in FIG. 7 the camera mounting structure includes a hoop 726 mounted to the base 737 via an extension 738. The hoop 726 includes an inner surface 730 that defines an aperture 728. The inner surface 730 is sized and shaped to securely hold a camera within the aperture 728 of the hoop 726. In some embodiments, the camera and inner surface 730 are friction- or press-fit together such that the friction between the inner surface 730 of the hoop 726 and an outer surface of the camera holds the camera within the aperture 728.

As with the hoop 126 shown in FIGS. 1 and 2, the hoop 726, the inner surface 730, and the aperture 728, although shown as circular in the embodiment of FIG. 7, may have a noncircular shape. For example, the inner surface 730 and the hoop 726 may be square, rectangular, or other shape that conforms to the outer surface of a camera.

The camera mount 704, and in particular the base 737, may include cable management features. For example, The base 737 includes a cable routing slot 732 connected to a cable routing aperture 736 and a cable clip 734. The cable clip 734 extends from a bottom surface of the base 737 and includes an opening to receive and hold one or more cables.

The handheld device 750 includes a body 755. The body 755 houses the internal components of the handheld device 750. The components of the handheld device 750 may include a processor, memory, input, output circuitry, communication components and other electrical components associated with a remote control or other handheld device. The internal components are coupled to the inputs 754 located on an upper surface 753 of the handheld device 750. The internal components receive inputs from the input 754 or measure the state of the inputs 754 to determine the actions requested by a user. Based on a user's input, the internal components of the remote control, for example, a processor, may issue commands that are transmitted via communication components within the handheld device 750. For example, the handheld device 750 may include an infrared transmitter as part of the internal components. The infrared light transmitted by the infrared transmitter may pass through a window 758 at the end of the handheld device 750. The body 155 of the handheld device 750 includes two sides 756, a bottom surface 757, and the upper surface 753. The handheld device 750 extends longitudinally between a first end 752, generally used as the gripping end or holding end of the handheld device 750, and a second end 759, also referred to as the a distal end of the handheld device 750.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for using a camera and handheld device coupler, the method comprising:
   coupling a handheld device to a bracket, the bracket having a cavity, the cavity defined by a base and opposing first and second sides and first and second sidewalls extending from the base at respective ones of the first and second sides, the handheld device including buttons that are configured to be selected by a user by pressing the buttons, the handheld device also including a wireless transmitter that outputs control signals to a separate display device that is spaced away from the camera and the handheld device, and, when coupled to the handheld device, an entirety of the base and an entirety of the first and second sidewalls extend only along respective base and sidewalls of only a first end of the handheld device, the first end of the handheld device including the wireless transmitter;
   coupling a camera to a camera mount, the camera mount located at a distal end of a mast, the mast extending from a third side of the cavity;
   pointing an image receiving lens of the camera at the handheld device to obtain a view of the buttons on the handheld device that are to be selected by the user;
   activating the camera to obtain an image of the buttons configured to be selected by a user, the activating occurring prior to any button on the handheld device being selected by the user;
   imaging the handheld device while a user uses the handheld device;
   selecting buttons that cause the wireless transmitter of the handheld device to output control signals to the display device that is physically separate and spaced away from the bracket, the camera and the handheld device, the selecting of the buttons occurring after the camera has been activated and after the handheld device has been imaged by the camera; and recording, using the camera, the selection of buttons on the handheld device by the user.

2. The method for using a camera and handheld device coupler of claim 1, wherein coupling a handheld device to a cavity includes:

using a clamping force between the sidewalls of the base of the bracket to hold the handheld device in the cavity.

3. The method for using a camera and handheld device coupler of claim 1, wherein coupling a camera to a camera mount includes:

inserting the camera through an aperture of a hoop, the hoop extending from the camera mount.

4. The method for using a camera and handheld device coupler of claim 1, further comprising:

adjusting an orientation of the mast.

5. The method for using a camera and handheld device coupler of claim 4, further comprising:

adjusting the orientation of the camera mount.

6. The method according to claim 1 further including:

positioning a front region of the handheld device to align with an aperture at the front region of the bracket to permit wireless signals output by the handheld device to pass through the aperture, wherein the mast is integrally formed with the base of the bracket and the mast has a mast aperture to permit wireless signals output by the handheld device to pass through the mast aperture.

\* \* \* \* \*